United States Patent [19]

Beever et al.

[11] Patent Number: 4,820,366

[45] Date of Patent: Apr. 11, 1989

[54] APPARATUS AND METHOD FOR PULTRUDING REINFORCED PLASTIC ARTICLES

[75] Inventors: William H. Beever; Larry M. Selby, both of Bartlesville, Okla.

[73] Assignee: Phillips Petroleum Company, Bartlesville, Okla.

[21] Appl. No.: 22,386

[22] Filed: Mar. 6, 1987

[51] Int. Cl.$^4$ .................. B32B 27/02; B32B 31/12
[52] U.S. Cl. .................... 156/166; 156/180; 156/242; 156/433; 156/441; 156/498
[58] Field of Search ............... 156/166, 242, 433, 441, 156/180, 498, 500

[56] References Cited

U.S. PATENT DOCUMENTS

| | | | |
|---|---|---|---|
| Re. 30,770 | 10/1981 | Shobert et al. | 156/180 |
| 2,702,408 | 2/1955 | Hartland | 264/211.21 |
| 2,751,320 | 6/1956 | Jacobs et al. | 156/166 |
| 2,948,649 | 8/1960 | Pancherz | 156/166 |
| 3,200,022 | 8/1965 | Matton | 156/169 |
| 3,470,051 | 9/1969 | Meyer | 156/171 |
| 3,740,304 | 6/1973 | Okumuro et al. | 156/180 |
| 3,873,399 | 3/1975 | Goldsworthy et al. | 156/441 |
| 3,993,726 | 11/1976 | Moyer | 264/174 |
| 4,354,889 | 10/1982 | Berger | 156/166 |
| 4,462,946 | 7/1984 | Goldsworthy | 264/23 |
| 4,588,538 | 5/1986 | Chung et al. | 264/29.2 |

OTHER PUBLICATIONS

Joseph E. Sumerak and Jeffrey D. Martin, "It's Time We Really Understood Pultrusion Process Variables", Plastics Technology, Feb., 1984, pp. 13-19.
Raymond W. Meyer, Handbook of Pultrusion Technology, p. 48.
Modern Plastics, Jun. 1976.
Michael Colangelo and Matthew H. Naitove, Plastics Technology, "Pultrusion Process Technology: Beyond Infancy, Not Yet Mature", Aug. 1983, pp. 49-53.
Composite Materials Handbook, pp. 4.62-4.67.
"Pultrusion, Part 1" and Pultrusion, Part 2, published in the Jul. 1980, and Aug. 1980 issues, respectively, of Plastics Design and Processing.
The Handbook of Pultrusion Technology, p. 48.
European Patent Application No. 84103823.5, assigned to the assignee of the present invention.

*Primary Examiner*—Caleb Weston
*Attorney, Agent, or Firm*—Laney, Dougherty Hessin & Beavers

[57] ABSTRACT

An apparatus and method for pultruding reinforced plastic articles. The apparatus includes a first, hot die having a long tapered portion. The hot die partially consolidates resin-impregnated fibers into an oversized form. After exiting the hot die, the partially consolidated material is passed through a second, cooling die which finally consolidates the material and forms it into the desired, final shape. The cooling die is at a temperature less than the temperature of the hot die. Preferably, the cooling die has a tapered portion which is shorter than the tapered portion of the first die. A method is disclosed for pultruding plastic articles using the apparatus.

16 Claims, 1 Drawing Sheet

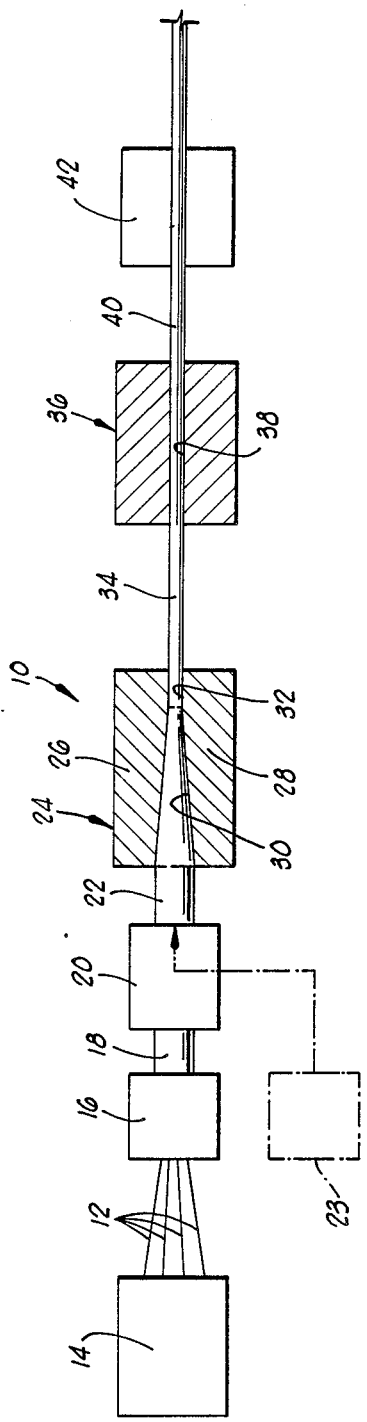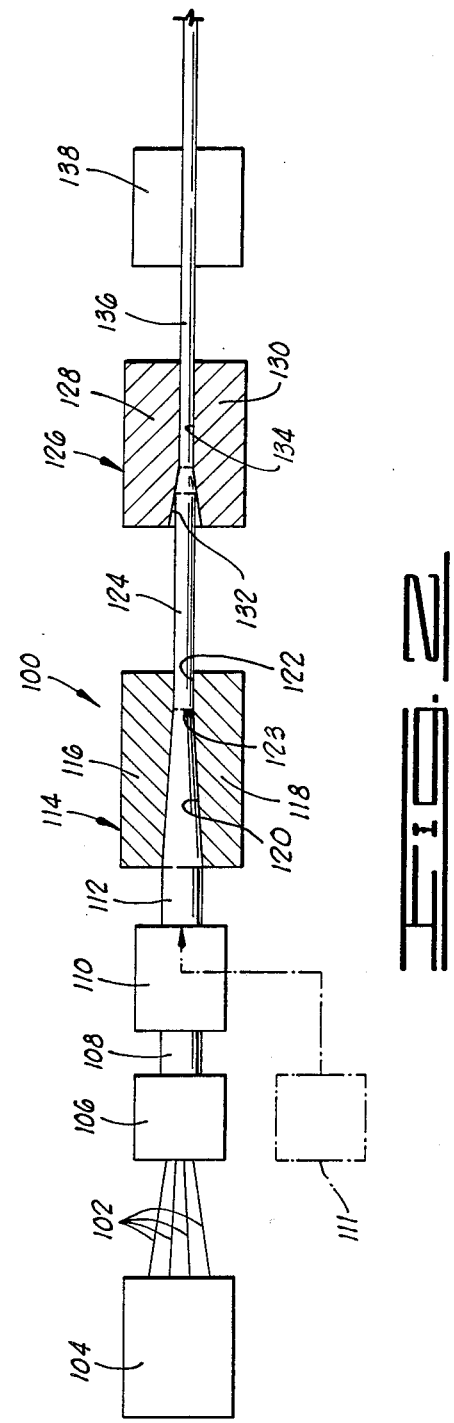

APPARATUS AND METHOD FOR PULTRUDING REINFORCED PLASTIC ARTICLES

BACKGROUND OF THE INVENTION

1. Field of the Invention

This invention relates to apparatus and methods for pultruding reinforced plastic shapes, and more particularly, to an apparatus and method using a cooling post-forming die after a hot preforming die.

2. Description of the Prior Art

In a typical prior art pultrusion process fo making reinforced plastic shaped objects has been accomplished by pulling fibers through a resin bath, through a pre-heater, and then through a hot shape forming die. The final shape consolidation then took place in the hot die. Such a process is disclosed in the prior art discussion of U.S. Pat. No. 4,462,946 to Goldsworthy.

A similar process, described in more detail herein, adds the step of passing the shaped objects through a cooling die after the objects are formed in the hot die. The cooling die is used merely to cool the objects which are already dimensionally in their final form.

A major problem with this prior pultrusion process is that "ball-ups" tend to occur in the hot die during consolidation into the final form. The term "ball-ups" refers to a problem which occurs when the fiber picks up too much resin. As the mass of resin is pulled through the die, fibers can be broken off along the surface of the pultruded article and such a damaged surface is undesirable. Sometimes, the entire string of material can break which is obviously also undesirable. When either occurs, the production line must be shut down, and the hot die disassembled for removal of the ball-ups. Restarting the production after disassembling the hot die is very difficult because the bundle of fibers impregnated with resin entering the hot die tends to spread out when the die is opened, thus making it difficult to close without catching fibers between the die halves.

The present invention solves this problem by using the hot die to form an oversized, shaped part, and then using the cooling die to form the final shape. The final consolidation is what usually causes ball-ups, and because the final consolidation takes place in the cooling die of the present invention, the ball-ups will tend to occur there, rather than the hot die. When the cooling die is opened to remove the ball-ups, there is less spreading of the fibers across the open die interface since the fibers are already partially consolidated in the plastic and thus do not spread easily. Further, ball-ups are less likely in the cooling die, since during cooling, the consolidated shape tends to shrink and pull away from the surface of the cool die such that the frictional forces contributing to most ball-ups is not present.

The reduced friction also allows the entire system to run more smoothly and for longer periods of time.

A die with two temperature zones is disclosed in U.S. Pat. No. 2,702,408 to Hartland. In this die, the second zone can be cooler than the first zone. The first zone is disclosed to have a slightly sharper taper than the second zone.

The device of Hartland does not accomplish the same purpose as the apparatus and method of the present invention. In the present invention, partial consolidation takes place in the hot die which has a long tapered first portion and a second portion of substantially constant cross-sectional thickness. If a short taper were used in the hot die, too much friction would be encountered in the correspondingly longer constant cross-sectional portion and, as already indicated, such friction causes ball-ups. In the present invention, the material exiting the hot die is sized larger than the final form. This oversized article then enters the cooling, final forming die as a separate step in the process. The cooling die has a shorter taper than the first die which allows fast consolidation. The fast consolidation is made possible in the cooling die because the cooling effect tends to pull the shape away from the surface of the die, reducing friction. If a longer taper were used in the cooling die, the material would cool too quickly before it reached the constant cross-section portion.

Unlike the apparatus of Hartland, it is not necessary to handle the hot die in the event of a ball-up because the ball-ups will normally occur in the cooling die. It is a simple matter to open the cooling die, remove the ball-up, squeeze or massage the material so that the cooling die halves can be closed back together, and the system restarted.

SUMMARY OF THE INVENTION

The apparatus of the present invention for use in pultruding reinforced plastic parts comprises material supply means for supplying a resin-impregnated reinforced material, first forming means for partially consolidating the material and for shaping the partially consolidated material to an oversized form, second forming means for finally consolidating the material and for shaping the finally consolidated material to a final form, and pulling means for pulling the material from the material supply means and through the first and second forming means. The first forming means is heated, and the second forming means is cooler than the first forming means. The second forming means may be heated or cooled as necessary to maintain the desired temparature differential between the first and second forming means. Preferably, the second forming means is spaced from the first forming means.

In one embodiment, the material supply means comprises reinforcement fiber supply means, such as a creel, for supplying a substantially continuous strand of fiber reinforcing material and impregnation means, such as a resin bath, for impregnating the fiber strand with a plastic to form the resin-impregnated reinforced material. In this embodiment, the apparatus may further comprise preheating means between the impregnation means and the first forming means for eliminating moisture from the resin and strand prior to the entry thereof into the first forming means. In an alternate embodiment, the material supply means is characterized by a means for supplying pre-impregnated material to the first forming means. Such pre-impregnated material includes, but is not limited to, prepreg and preformed shapes such as bars, rods or channels.

In the preferred embodiment, the first forming means is characterized by a heated die, and the second forming means is characterized by a cooling die. The heated die has a tapered portion which is tapered from an entry side thereof to a constant cross-sectional portion, the constant cross-sectional portion opening at an exit side of the heated die. The intersection of the tapered and constant cross-sectional portions is preferably nearer the exit side of the heated die than the entry side thereof. Also in the preferred embodiment, the cooling die has a tapered portion which is shorter than the tapered portion of the heated die, and the cooling die also has a constant cross-section portion. Each of the heated and cooling dies normally comprises two die halves.

In one embodiment, the oversized form exiting the first forming means has a cross-sectional area in the range of approximately 10% to 25% larger than the cross-sectional area of the final form exiting the second forming means.

The invention further includes a method of pultruding plastic articles comprising the steps of passing a plastic material through a heated first die such that material is shaped oversize with respect to a desired, final form and passing the material through a second die, cooler than the first die, such that the material is shaped to the desired shape. The method further comprises, prior to the step of passing the material through the first die, the step of supplying the plastic material in the form of a resin-impregnated reinforcing material. In one embodiment, the step of supplying the plastic material in the form of a resin-impregnated fiber string comprises pulling a fiber strand from a fiber supply means and impregnating the strand with a plastic resin to form an impregnated strand. In this embodiment, the method may also comprise, between the step of impregnating and the step of passing the material through the first die, the step of preheating the material.

The step of passing the material through the first die comprises partially consolidating the plastic material, and the step of passing the material through the second die comprises finally consolidating the material.

Stated in another way, the method comprises the steps of pulling the reinforced material from a supply means, rough forming the material into a rough shape oversized with respect to a final form by passing the material through heated first forming means, and final forming the rough shape into the final shape by passing the material through second forming means. Preferably, the step of rough forming comprises passing the material through a tapered portion of a first die, and the step of final forming comprises passing the material through a tapered portion of a second die wherein the tapered portion of the second die is shorter than the tapered portion of the first die. The second forming means is at a temperature less than the first forming means and may be heated or cooled as desired.

An important object of the present invention is to provide an apparatus and method for pultruding reinforced plastic articles while reducing ball-ups in the shape forming dies.

Another object of the invention is to provide an apparatus and method for pultruding plastic articles having a hot die for forming an oversized shape and a cooling die for forming the final, desired shape.

A further object of the invention is to provide a pultrusion apparatus having a hot die with a tapered portion therein and a cooling die with a tapered portion therein which has a shorter taper than the tapered portion of the hot die.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 1 schematically illustrates a typical prior art pultrusion process and the apparatus used therein.

FIG. 2 schematically illustrates the apparatus and method of the present invention for making pultruded reinforced plastic articles.

DESCRIPTION OF THE PREFERRED EMBODIMENT

Referring now to the drawings, and more particularly to FIG. 1, a prior art apparatus for pultruding reinforced plastic, shaped articles is illustrated and designated by the numeral 10.

In one embodiment, at least one fiber strand 12 is pulled off a creel 14. Fibers 12 are pulled through a resin bath 16 where the fibers are impregnated with plastic resin. The resin-impregnated fibers exiting resin bath 16 next pass through a preheater 20 which drives off moisture from the resin.

The dried resin-impregnated fibers 22 then enter hot die 24. In an alternate embodiment, creel 14, resin bath 16 and preheater 20 are replaced by supply means 23 which supplies pre-impregnated material to hot die 24.

Hot die 24 typically includes first and second die halves 26 and 28 defining a die cavity having a long, tapered first portion 30 followed by a second portion 32 of substantially constant cross-sectional area. Final consolidation of dried resin-impregnated fibers 22 takes place in hot die 24, and the resin-impregnated fibers are formed into the final shaped material 34 which exits hot die 24. Shaped material 34 next passes through a cooling die 36 defining a cavity 38 therein of substantially constant cross-sectional area. Cooling die 36 does not shape material 34 in any way. The purpose of cooling die 36 is merely to provide a cooled material 40 which exits the cooling die.

Pulling means 42, of a kind known in the art, transport cooled material 40, and thus provide a continuous pulling force and motion through the entire apparatus.

Prior art apparatus 10 has a major problem in that "ball-ups" can occur in hot die 24 when fibers 12 pick up too much resin in resin bath 16 or, in the alternate embodiment, during pre-impregnation. This results in resin-impregnated fibers 22 clogging hot die 24, resulting in damage to the surface of shaped material 34 or breaking of the string of fiber and resin. When either occurs, it is necessary to stop the production line and separate first and second halves 26 and 28 of hot die 24 so that the ball-ups can be removed. Restarting the production line after opening hot die 24 is very difficult. Resin-impregnated fibers 22 which enter hot die 24 tend to spread out when the die is opened. This makes it difficult to close hot die 24 without resin-impregnated fibers 22 becoming stuck between die halves 26 and 28. As a result, it is usually necessary for the production line to be restarted by pulling raw fiber or fresh pre-impregnated material through the entire apparatus, as is necessary for an initial start-up. Obviously, this results in much lost production time.

A further problem with ball-ups in systems using thermoset plastics is that the ball-ups tend to occur because the polymer is cured or set up too fast. In such cases, ball-ups are not easily removed, but ordinarily must be drilled out from hot die 24.

The problem with ball-ups in the hot die forming process are eliminated by the apparatus used in the present invention which is shown in FIG. 2 and generally designated by the numeral 100.

In a first embodiment, at least one fiber strand 102 is pulled off a creel 104 and then pulled through a resin bath 106. Resin-impregnated fibers 108 exiting resin bath 106 may then be passed through an optional preheater 110 to drive the moisture therefrom. In an alternate embodiment, creel 104, resin bath 106 and preheater 110 are replaced by pre-impregnated material supply means 111. Thus, in either embodiment, a supply means for supplying resin-impregnated fiber reinforcing material is provided. To this point, the apparatus and method of the present invention is substantially identical to that of prior art apparatus 10 shown in FIG. 1.

Dried resin-impregnated fibers 112 next enter a heated, first die 114, also referred to as a hot die 114. Hot die 114 is preferably formed of first die half 116 and second die half 118 which define a cavity therein having a long, tapered first portion 120 followed by a second portion 122 of substantially constant cross-sectional area. The intersection 123 of tapered first portion 120 and constant cross section second portion 122 is preferably nearer the exit side of hot die 114 than the entry side of the hot die. If tapered first portion 120 is too short with respect to constant cross section second portion 122, too much friction occurs in second portion 122 which results in ball-ups.

Unlike the prior art, hot die 114 does not provide final consolidation and shaping of the plastic articles. Instead, the cross-sectional area of second portion 122 is somewhat larger than the desired final shape. In one preferred embodiment, the cross-sectional area of second porton 22 of hot die 114 is in the range of approximately 10% to 25% greater than the cross-sectional area of the desired final shape, although the invention is not intended to be limited to this particular size differential range.

Hot die 114 provides partial consolidation of the resin and fibers such that partially consolidated material 124 exits the hot die. Thus, partially consolidated material 124 is rough formed and oversized with respect to the final material.

Partially consolidated material 124 is pulled through a cooling die 126 which provides final consolidation and shaping of the material. Cooling die 126 is spaced from hot die 114. Preferably, cooling die 126 includes first die half 128 and second die half 130 which define a cavity therebetween having a short, tapered first portion 132 and a second portion 134 of substantially constant cross-sectional area. Tapered portion 132 is preferably shorter than tapered portion 120 and hot die 114, although the angle of taper may be approximately the same. This shorter taper provides fast consolidation as the material passes through cooling die 126. If tapered portion 132 is too long, partially consolidated material 124 will cool too quickly before it reaches constant cross section second portion 134.

Hot die 114 must have a longer taper to that consolidation does not take place too quickly which is undesirable in the hot die because of the friction build-up occurring between the molten polymer and die cavity. Fast consolidation is permissible in cooling die 126 because the cooling effect of the cooling die tends to cause the material to shrink and pull away from the die surface, thereby reducing friction.

Finally, consolidated, cool material 136 exits cooling die 126 at which point it is engaged by a pulling means 138 of a kind known in the art. Pulling means 138, as with pulling means 42 in the prior art, preferably maintains a substantially constant pulling force and movement of the resin and fibers through apparatus 100.

Cooling die 126 is at a lower temperature than hot die 114. However, cooling die 126 may also be heated to obtain the desired temperature. Normally, heating of cooling die 126 is only required during the start-up of the process. Once fiber and resin material is traveling through the dies, partially consolidated material 124 will heat up cooling die 126 as it passes therethrough. In some cases, it may be necessary to provide cooling to cooling die 126 to insure that the proper temperature difference is maintained between the cooling die and hot die 114.

The process is adaptable for virtually any plastic resin and any fiber reinforcing material. For example, the plastic material may be polyphenylene sulfide (PPS) available under the trademark RYTON® from the assignee of the present invention, and the reinforcing material may be any one of a group including glass, carbon, aramid, or other suitable reinforcing materials. For PPS, it has been found desirable to maintain hot die 114 at approximately 350° C. with cooling die 126 in the range of approximately 90° to 180° C., but the invention is not intended to be limited to these particular temperatures or materials. The important aspect is that cooling die 126 operates at a temperature less than hot die 114.

Final consolidation of the material is usually what causes ball-ups. With present invention 100, the final consolidation takes place in cooling die 126, rather than hot die 114. Thus, the ball-ups are much more likely to occur in cooling die 126 than hot die 114. However, because the material tends to pull away from the cool die surface, ball-ups are much less likely to occur in cooling die 126 of present invention 100 than in hot die 24 of prior art apparatus 10.

Should ball-ups occur in apparatus 100, the problems encountered with the spreading of fibers in the prior art are lessened because the material is already partially consolidated by the time it reaches cooling die 126. Thus, when first and second halves 128 and 130 of cooling die 126 are separated for the purpose of removing the ball-up, the fibers do not spread across the open die interface as much as in prior art apparatus 10. Once the ball-up has been removed, die halves 128 and 130 are closed together. Due to less fibers spreading upon opening of cooling die 126 and also due to the short taper of tapered first position 132 and the space between hot die 114 and cooling die 126, die halves 128 and 130 may be carefully closed without pinching the fibers between the die halves, although it may be necessary to squeeze or massage partially consolidated material 124 before closing the die halves. Thus, it is not necessary to completely restart the process by pulling raw fiber through the entire apparatus.

It can be seen, therefore, that the apparatus and method of pultruding a plastic article of the present invention are well adapted to carry out the ends and advantages mentioned as well as those inherent therein. While presently preferred embodiments of the structure and method have been illustrated for the purposes of this disclosure, numerous changes in the arrangement and construction of parts and numerous changes in the order and implementation of the various steps may be made by those skilled in the art. All such changes are encompassed within the scope and spirit of the appended claims.

What is claimed is:

1. An apparatus for pultruding reinforced plastic parts, said apparatus comprising:
supply means for supplying a plastic resin-impregnated reinforcing material;

first forming means for partially consolidating said material and for shaping the partially consolidated material to an oversized form, said first forming means being heated and comprising a tapered portion which is tapered from an entry side thereof to a constant cross-section portion, said constant cross-section portion opening at an exit side of said first forming means, wherein an intersection of said tapered and constant cross-section portions is nearer said exit side than said entry side of said first forming means for minimizing frictional buildup between said material and said first forming means;

second forming means, spaced from said first forming means, for finally consolidating said material and for shaping the finally consolidated material to a final form, said second forming means being cooler than said first forming means and comprising a tapered portion which is tapered from an entry side thereof to a constant cross-section portion, said constant cross-section portion opening at an exit side of said second forming means, said tapered portion of said second forming means being shorter than said tapered portion of said first forming means for providing fast consolidation of said material without cooling said material too quickly before said material enters said constant cross-section portion of said second forming means; and pulling means for pulling said material from said supply means and through said first and second forming means.

2. The apparatus of claim 1 wherein:
said first forming means is characterized by a heated die; and
said second forming means is characterized by a cooling die.

3. The apparatus of claim 2 wherein each of said heated and cooling dies comprises two die halves.

4. The apparatus of claim 1 wherein said supply means is characterized as a means for supplying pre-impregnated material.

5. The apparatus of claim 1 wherein said supply means comprises:
reinforcement material supply means for supplying a substantially continuous strand of fiber reinforcing material; and
impregnation means for impregnating said strand with plastic resin material.

6. The apparatus of claim 5 further comprising preheating means for eliminating moisture from said resin and strand prior to entry into said first forming means.

7. The apparatus of claim 1 wherein said oversized form has a cross-sectional area in the range of approximately ten to twenty-five percent larger than a cross-sectional area of said final form.

8. A method of pultruding plastic articles comprising the steps of:
making a reinforced plastic material by resinimpregnating a fiber string;
partially consolidating said reinforced plastic material by passing said reinforced plastic material through a heated first die such that said material is rough formed and shaped oversize with respect to a final, desired form, said step of partially consolidating comprising:
passing said material through a tapered first portion of said first die; and
passing said material through a constant cross-section portion of said first die which is relatively shorter than said tapered portion thereof;
whereby friction is minimized in said first die; and
finally consolidating said material by passing said material through a second die such that said material is shaped to said final, desired shape, said second die being cooler than said first die, said step of finally consolidating comprising:
passing said material through a tapered portion of said second die which is relatively shorter than said tapered portion of said first die, thereby quickly consolidating said material and preventing premature cooling thereof; and
passing said material through a constant cross-section portion of said second die which is relatively longer than said tapered portion of said second die.

9. The method of claim 8 further comprising, between said step of making by impregnating and said step of passing said material through said first die, a step of preheating said material.

10. The method of claim 8 wherein said step of passing said material through said first die shapes said material to an oversized form in the range of approximately ten to twenty-five percent larger in cross-sectional area than said desired form.

11. The method of claim 8 wherein said second die is cooled.

12. A method of continuously forming reinforced plastic articles comprising the steps of:
pulling a fiber strand from a fiber supply means;
impregnating said strand wth a plastic resin to form an impregnated strand of reinforced plastic material;
rough forming said material into a rough shape oversized with respect to a final shape by passing said material through heated first forming means having a tapered portion, sized for minimizing friction which can cause ball-ups in said material, followed by a constant cross-section portion which is shorter than said tapered portion; and
final forming said rough shape into said final shape by passing said material through second forming means having a tapered portion shorter than said tapered portion of said first forming means for providing fast consolidation of said material while preventing premature cooling thereof.

13. The method of claim 12 further comprising, between said steps of impregnating and rough forming, a step of preheating said impregnated strand.

14. The method of claim 12 wherein said step of rough forming results in said rough shape being in the range of approximately ten to twenty-five percent greater in cross-sectional area than said final shape.

15. The method of claim 12 wherein said second forming means is at a temperature less than said first forming means.

16. The method of claim 15 wherein said second forming means is cooled.

* * * * *